United States Patent
Voigt et al.

(10) Patent No.: US 9,797,675 B2
(45) Date of Patent: Oct. 24, 2017

(54) ARCHERY EQUIPMENT CONVEYANCE BAG

(71) Applicants: Karen A. Voigt, Imperial, MO (US); Anna M. Boehm, Barnhart, MO (US)

(72) Inventors: Karen A. Voigt, Imperial, MO (US); Anna M. Boehm, Barnhart, MO (US)

(73) Assignee: Spirit USA Archery, LLC, Imperial, MO (US)

( * ) Notice: Subject to any disclaimer, the term of this patent is extended or adjusted under 35 U.S.C. 154(b) by 0 days.

(21) Appl. No.: 14/998,698

(22) Filed: Feb. 3, 2016

(65) Prior Publication Data

US 2016/0265867 A1    Sep. 15, 2016

Related U.S. Application Data

(60) Provisional application No. 62/177,231, filed on Mar. 10, 2015.

(51) Int. Cl.
| | |
|---|---|
| *B65D 85/00* | (2006.01) |
| *F41B 5/14* | (2006.01) |
| *F42B 39/00* | (2006.01) |
| *B62B 1/26* | (2006.01) |

(52) U.S. Cl.
CPC .......... *F41B 5/1457* (2013.01); *B62B 1/266* (2013.01); *F42B 39/007* (2013.01)

(58) Field of Classification Search
CPC ........ F41B 5/1457; F41B 5/14; F41B 5/1442; F42B 39/007; A45C 11/00; B62B 1/266

USPC ....... 206/315.11, 315.1, 317; 190/102, 18 A, 190/18 R, 108, 109, 111; 280/37, 651, 280/652, 654, 47.17
See application file for complete search history.

(56) References Cited

U.S. PATENT DOCUMENTS

| | | | | | |
|---|---|---|---|---|---|
| 2,771,620 | A | * | 11/1956 | Hoffman ................. | F41B 5/063 206/315.11 |
| 3,058,505 | A | * | 10/1962 | Emmett .................... | F41B 5/06 124/23.1 |
| 5,240,106 | A | * | 8/1993 | Plath ........................ | A45C 5/14 190/102 |
| 5,358,108 | A | * | 10/1994 | Celaya ................... | F42B 39/007 206/315.11 |
| 5,971,148 | A | * | 10/1999 | Jackson ................ | G06F 1/1628 108/43 |

(Continued)

*Primary Examiner* — Jacob K Ackun
*Assistant Examiner* — Jenine Pagan
(74) *Attorney, Agent, or Firm* — Paul M. Denk

(57) ABSTRACT

An archery equipment conveyance bag including a container member, having a closure cover provided upon its upper surface, and connected thereto by means of a zipper, or other connectors, the bag being separated by at least one or more dividers, formed of rigid polymer or related material, so that a plurality of bows may be located within the formed compartments within the bag, and in an alternative arrangement, include a series of aligned tubes for holding arrows within the bag during transit or storage. Various pouches or accessory compartments may be applied to the outer surface of the conveyance bag, even those that may be removable, for aid in the conveyance of the accessories used during archery performance. In addition, the conveyance bag may rest upon and connect with a dolly member, in order to facilitate the wheeled movement of the archery ladened conveyance bag to another location, during application and usage.

6 Claims, 4 Drawing Sheets

(56) References Cited

U.S. PATENT DOCUMENTS

| | | |
|---|---|---|
| 6,142,544 A | 11/2000 | Benzoni et al. |
| 6,237,764 B1 | 5/2001 | Kastelic |
| D477,711 S | 7/2003 | Rossi et al. |
| D477,712 S | 7/2003 | Rossi et al. |
| D478,724 S | 8/2003 | Rossi et al. |
| D642,797 S | 8/2011 | Rogers |
| 8,827,072 B2 * | 9/2014 | Herron ............... A63B 55/00 206/315.3 |
| 2003/0188943 A1 * | 10/2003 | Freedman ............ D06F 95/002 190/112 |
| 2014/0231286 A1 * | 8/2014 | Watson ................. F41B 5/14 206/315.11 |

* cited by examiner

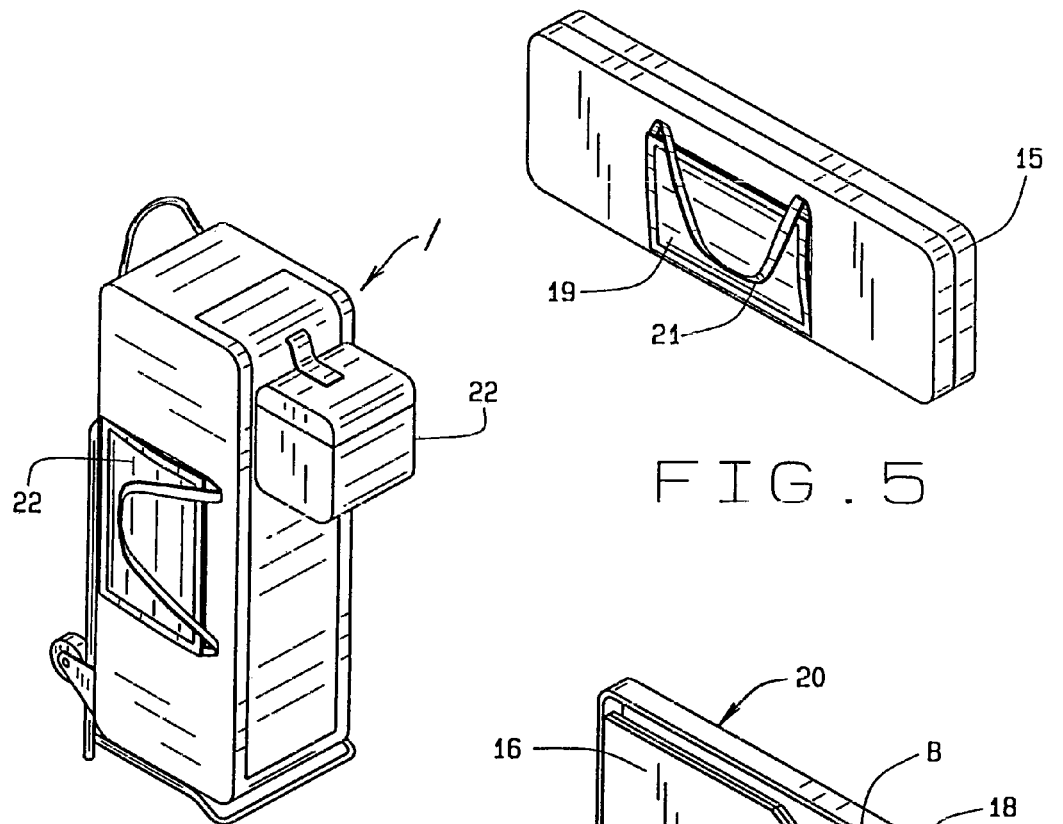
FIG. 5
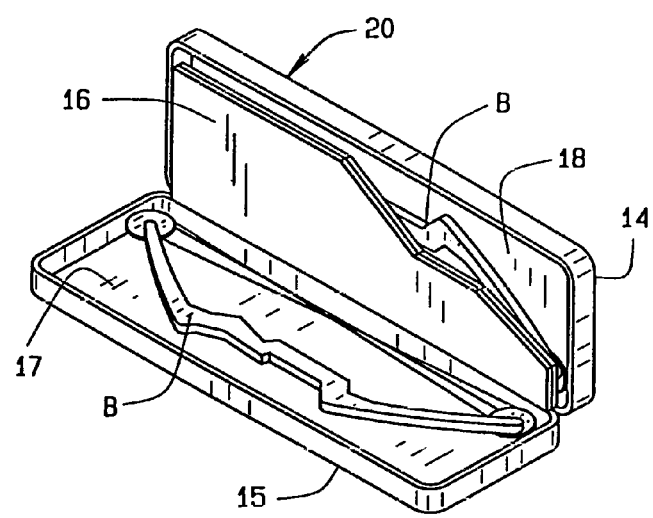
FIG. 7
FIG. 6

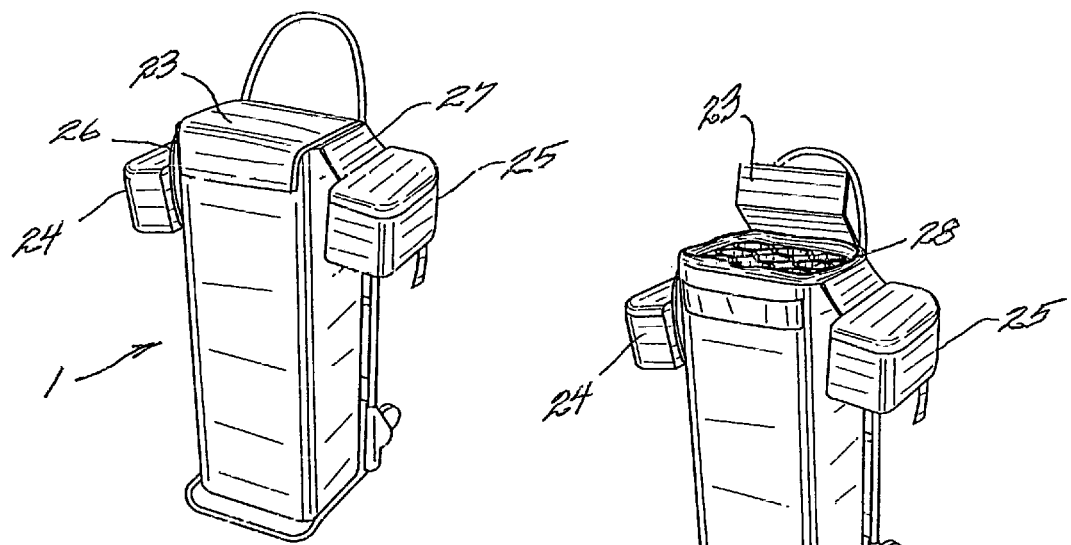
FIG. 8
FIG. 9
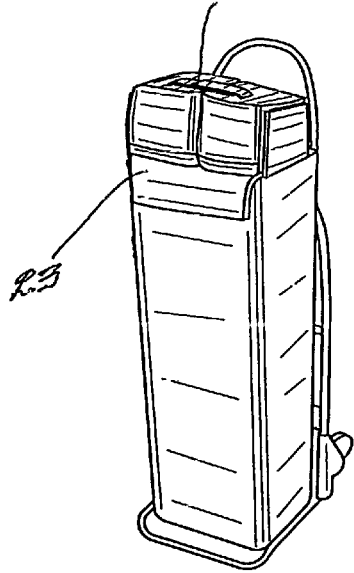
FIG. 10

ARCHERY EQUIPMENT CONVEYANCE BAG

CROSS REFERENCE TO RELATED APPLICATION

This non-provisional patent application claims priority to the provisional application having Ser. No. 62/177,231, filed on Mar. 10, 2015.

FIELD OF THE INVENTION

The concept of this invention is to provide a comprehensive bag that can be used for conveyance of the variety of equipment used in the sport of archery. This includes facilities within the bag for holding bows, arrows, and other accessories used in the performance of archery activities.

BACKGROUND OF THE INVENTION

A myriad of bags and conveyance structures have long been available for carrying sporting goods, and other related items. Usually these types of bags are simply a duffle style bag, in which a lot of sporting equipment can be inserted, without regard to the protection of the individual items, their segregation, and their discreet location within the bag, so as to facilitate their removal, and usage. Furthermore, little effort has been given towards the separation of the items within the bag, so that they do not mar each other, particularly while being conveyed.

Examples of prior art include the following. The patent to Rossi et al, No. D478,724, shows a Product Packaging Bag For Sporting Equipment. In addition, another patent to Rossi et al, No. D477,712, shows a related structure. A further patent to Rossi et al, No. D477,711, shows a further variation upon a Product Packaging Bag For Sporting Equipment. The patent to Kastelic, U.S. Pat. No. 6,237,764, shows a Sporting Equipment Bag. The patent to Benzoni et al, U.S. Pat. No. 6,142,544, discloses a Device For Ball Retrieval And Storage. It includes a conveying type rack. The Archery Bag, invented by Rogers, is shown in U.S. Design Pat. No. D642,797.

SUMMARY OF THE INVENTION

This invention contemplates a conveyance bag that is segregated into various integral units, particularly for use in the field of archery, so as to provide convenient storage of, for example, a plurality of bows, a multitude of arrows, and the other various components that may be used during performance of archery events, such as gloves, replacement strings, sights, and other components used during archery performance.

This particular bag is for use for conveyance of the aforesaid type of items. The bag has sufficient longitudinal length, so that a plurality of bows may be located fully within the bag, a bag which will also have sufficient width, so as to allow such plurality of bows to be preferably separately or individually stored therein, preferably separated from each other by a partition, and may include a further series of longitudinally arranged tubes or related structures and into which a multitude of arrows may locate, in preparation for their conveyance, to the site of usage, and then their application during archery performance. The bag includes a series of longitudinal dividers, that may have sufficient rigidity, so as to be fabricated from a reasonably sturdy sheet of polypropylene, or other polymer or material, and which may have a softer fabric covering, so as not to mar the bows when stacked and arranged therein. In addition, other storage and accessory type bag(s) may be affixed to the conveyance bag, and may be held in position through the use of straps, or even Velcro, so as to be removable, when necessary, particularly when the conveyance bag is to be opened, and its contents removed, and the other accessories will be needed, within the removable smaller accessory bag that had been appended to the conveyance bag, during transit.

The longitudinal tubes for holding the arrows may be formed of, preferably, polymer material, such as PVC tubes, or any other polymer tube, or even hardened paperboard, which may function as this type of storage medium. Preferably the arrow storage will be arranged centrally within the conveyance bag, with dividers provided to either of their sides, so as to conveniently stack the arrow tubes vertically, but longitudinally aligned, within the conveyance bag, when assembled for usage. Then, one or more dividers, as previously described, may be provided to either side of the arrow encasement means, for holding, in the preferred embodiment, from two to six bows, or more, depending upon the capacity of the formed conveyance bag.

In the preferred embodiment, a wheeled carriage may be provided and onto which the conveyance bag may locate, the carriage may be somewhat in the form of a dolly like structure, with the conveyance bag being secured in place by means of a series of straps, so that the entire archery equipment conveyance bag can be wheeled from one location to the other, with little effort, as it is being assembled for transit and usage.

It is, therefore, the principal object of this invention to provide a wheeled archery equipment conveyance bag that may conveniently store all of the various bows, arrows, and other archery accessories that are required when participating in archery practice, competition, or even for hunting in the field, as may be desired.

A further object of this invention is to provide a conveniently structured conveyance bag, which separates all of the archery components from one another, during their storage or conveyance, in order to provide enhanced protection against abrasion or any other damage that may occur when such equipment is not separated during usage.

Another object of this invention is to provide a longitudinal bag, with sufficient height, in order to accommodate a plurality of archery bows, whether they be the standard or compound style of how, that do have significant dimensions in their structure but yet which can be conveyed and stored, individually, within the structured bag of this invention.

Another object of this invention is to provide the use of longitudinal dividers, formed of polymer, covered with a fabric, in order to add separation and protection to the archery equipment stored within the conveyance bag, during its application.

A further object of this invention is to provide a conveyance bag for archery equipment that may further include one or more accessory bags, that may be appended to or removable from the conveyance bag, to add to the convenience of the user when conveying or storing such equipment when applied.

These and other objects may become more apparent to those skilled in the art upon review of the summary of the invention as provided herein, and upon undertaking a study of the description of its preferred embodiment, in view of the drawings

BRIEF DESCRIPTION OF THE DRAWINGS

In referring to the drawings:

FIG. 5 shows a modification to the conveyance bag of this invention, as closed;

FIG. 6 shows the conveyance bag of FIG. 5, disclosing the location of a pair of separated bows within the opened case;

FIG. 7 shows the isometric view of the conveyance case of FIG. 1, and further disclosing how an accessory bag may be appended to the conveyance bag, for holding other archery accessories used during performance of the sport;

FIG. 8 shows an isometric view of the conveyance bag, also on its stand, and showing a pair of accessory bags appended to its upper edges;

FIG. 9 discloses a similar view to the conveyance case of FIG. 8, but shows how the top of the conveyance case may be opened, and include, in this instance, a series of tubes for holding a plurality of arrows; and FIG. 10 shows the conveyance case, and how the pair of accessory bags may be folded over the top, and held in place by a fastener, as during conveyance.

DESCRIPTION OF THE PREFERRED EMBODIMENT

Figure 1:
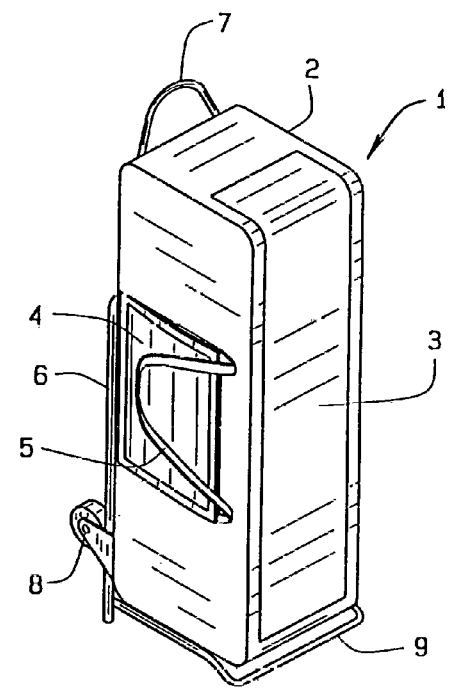
FIG. 1 provides an isometric view of an upright archery case, or conveyance bag, of this invention.

In referring to the drawings, and in particular FIG. 1, therein is shown the conveyance bag 1 for use for transporting archery equipment. The bag, as shown, has a compartment with all six sides, as at 2, with an opening top cover 3 which may be secured by a zipper, or the like, to the bag proper. In addition, a side accessory compartment 4 may also be provided, and which may be removable, for carrying by its handle 5, and for use for conveyance of accessories, as stated. The bag 1 is supported for movement upon its rollers through a dolly like member 6 which has a handle 7, and incorporates integrally its rollers 8 to facilitate movement of the bag, during usage. The member 6 includes a base 9 which rests upon the ground, as noted, and supports the bag in an upright position, as when at rest or when stored.

Figure 2:
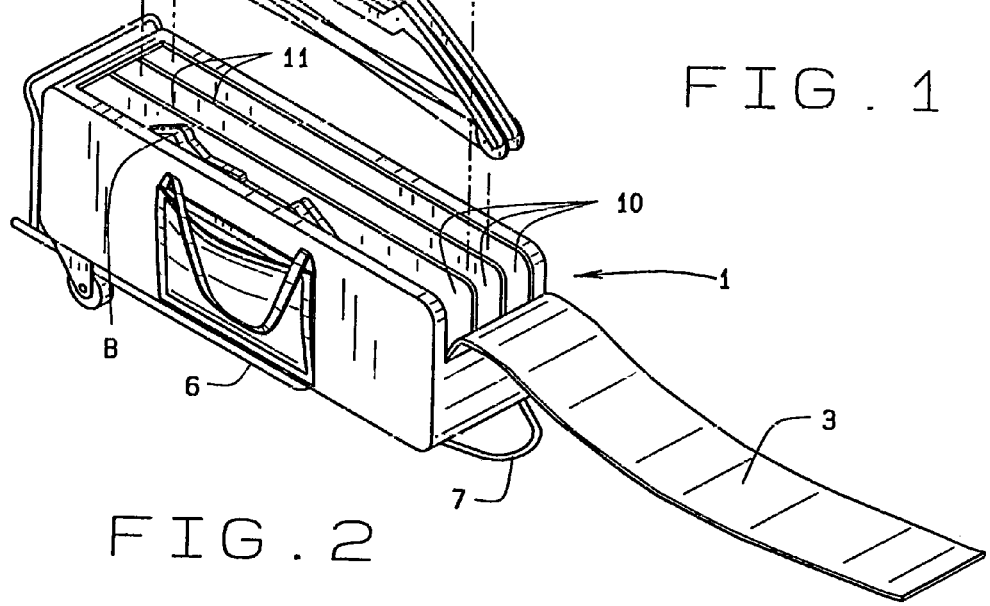
FIG. 2 shows the opened conveyance bag, with the plurality of bows in the process of being stored therein, or removed, as during usage.

The conveyance bag 1 is more aptly disclosed in FIG. 2, with its cover 3 being opened, and it can be seen that it includes a series of compartments, as noted at 10, and into which a variety of archery equipment, such as the shown bows B, may locate. As noted, the compartments are formed through the use of a series of dividers, as at 11, and which dividers preferably are formed of a high impact polystyrene; tricot lined ½", more or less, foam padding; or other polymer or related sheets, as previously summarized, and which may be covered with a polycotton fabric, such as one having an eight ounce texture, in order to add protection for the bows when inserted therein, and prevent their scratching or other marring. The fabric portion of the bag may be constructed of a fine denier fabric that is PVC backed or may have a polyester layer, so as to furnish a laminate type of material that is used for formation of the bag proper, during its fabrication.

It can also been seen that when the dolly member 6 is laid in a more prone position, and its cover 3 opened, it conveniently aligns its various compartments 10, for the removal or insertion of the archery bows, as can be noted.

Figure 3:
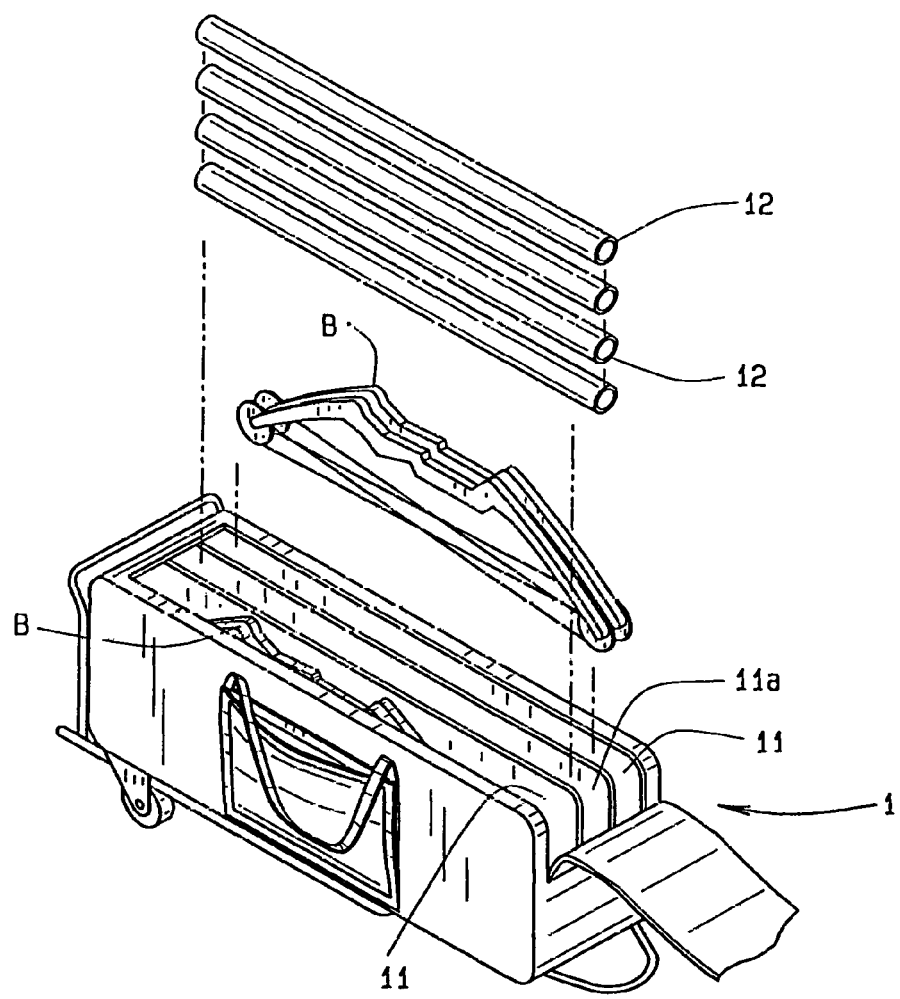
FIG. 3 shows the various storage components for the conveyance bag, disclosing how the plurality of longitudinal tubes may locate, generally centrally, or at other locations within the bag, for use for storing a multitude of arrows.

FIG. 3 shows a slight modification to the assembly of the conveyance bag, wherein the bag 1 in its central compartment 11A, may include a series of tubes, as noted at 12, and which may be conveniently stacked one upon the other, within said compartment 11A, and therein function as a means for storage of other archery accessories, such as the arrows, quivers, as can be understood. Thus, the central compartment 11A will hold the arrows, wherein the two side compartments 11 will have a pair or more of the archery bows located therein, for either storage, or conveyance.

Figure 4:
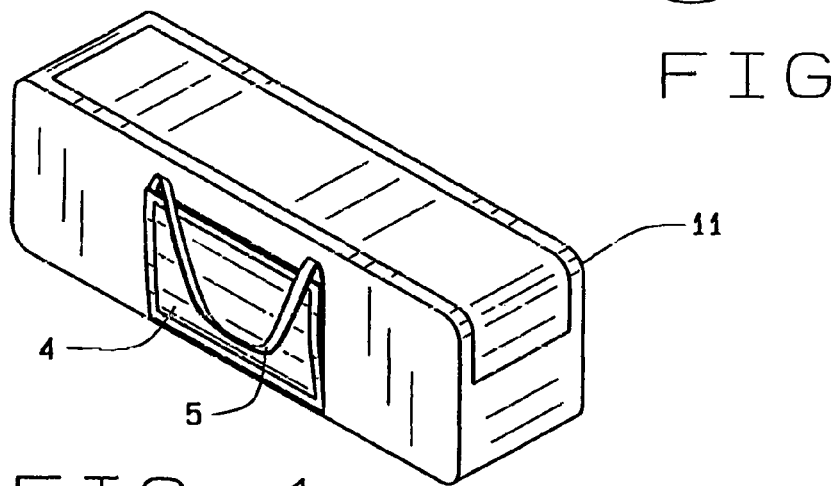
FIG. 4 shows the closed case when fully assembled, readied for usage, as removed from its wheeled carriage.

FIG. 4 shows the conveyance bag 1 in its fully closed position, and how the handle 5 of the accessory bag 4, may be used for conveyance of the entire bag, when it is not transported through the use of its dolly member 6. There may be a similar type accessory bag 4 on the opposite side of the conveyance bag, with its own handle 5, and the handles 5 can conveniently be used for grasping and conveyance of the bag, during its usage.

FIGS. 5 and 6 show a further modification to the conveyance bag 13 of this invention. As noted, it has a pair of side walls, as at 14 and 15, which affords a pair of compartments therein, through the use of the liner 16 as can be noted. The liner 16 may be hinged to the lower edge of the side wall 14, so it can be pivoted approximately 90°, to allow the respective bows B to be inserted into their various compartments 17 and 18 when assembled and the bows are installed therein. Once again, the accessory pouch 19 may be applied to one or both sides of the bag 20, in order to provide convenient handles 21 to aid in the conveyance of the respective bag.

FIG. 7 shows a view of the conveyance bag 1, and it further discloses how an accessory bags 22 can be located upon a surface of the bag, whether it be upon the top side, as noted, or to either side, and useful for conveyance of other archery accessories, during the application and usage of the shown bag. Such an accessory bag may be removable, or it may be held into position by use of a form of connector, such as the hook and pile connecting means as noted, so that it can be removed, and its contained accessories transported to some other location, when desired.

FIGS. 8-10 show a further variation upon the conveyance bag 1 of this invention. As noted, the top of the bag includes a cover 23, which drapes over the top of the bag, to enclose its interior. And, there are a pair of accessory bags 24 and 25 provided to either side proximate the top of the conveyance bag, and are held in position by means of their respective links 26 and 27, as can be noted. When the top cover 23 is opened, as noted in FIG. 9, it exposes the interior of the conveyance bag 1, which in this particular instance, holds a series of tubes, as noted at 28. These tubes are provided for holding a series of arrows, and in the preferred embodiment may carry as many as 120, or more, arrows within the interior. Then, as noted in FIG. 10, when the top cover 23 is closed, the side accessory bags 24 and 25 are pivoted upwardly, and come to rest upon the top of the conveyance bag, and may be fastened by use of a strap, such as a hook and pile strap, as noted at 29, to secure the accessory bags into position, for conveyance of the entire assembly.

The uniqueness of this archery equipment conveyance bag is that it may be fabricated and assembled to various designs, as for example, since archery is now a team sport, both in the Olympics, and even in colleges and some high schools, the conveyance bag may be fabricated to school colors, to further enhance its appearance, and attractiveness to the user. The entire bag will be constructed of high grade fabric, which may be padded with a lining, to assure that the accessory bag maintains its integrity, while storing and conveying the variety of archery products, after extensive usage.

Variations or modifications to the subject matter of this invention may occur to those skilled in the art upon review of the invention as disclosed herein. Such variations, if within the spirit of this invention, are intended to be encompassed within the scope of any claims to patent protection issuing hereon. The depiction of the invention in the drawings, and its description in the preferred embodiment, are set forth for illustrative purposes only.

We claim:

1. An archery equipment conveyance bag including a bag like member, said bag having a length, and a top cover extending the length of said bag and when opened exposing the interior of said bag along its entire length, said conveyance bag having a series of compartments provided interiorly along the length of said bag thereof, dividers extending the length of said bag and forming said series of compartments therein, and said compartments provided for holding archery equipment within said compartments, there being three said compartments provided in said bag, one compartment being a center arranged compartment and extending the length of said bag, and a pair of outer compartments, one each of said outer compartments being arranged outwardly of said center arranged compartment, and said outer compartments provided for accommodating the storage of archery bows therein;

a series of longitudinally arranged tubes provided locating and stacked in the said center compartment and also extending along its length thereof, and said tubes provided for accommodating the storage of archery arrows therein;

a dolly member, said dolly member accommodates the location or removal of the conveyance bag thereon, and which dolly member may be moved for transfer of the archery bow and arrow ladened bag to other locations.

2. The conveyance bag of claim 1 and including an archery accessory bag attaching externally with the conveyance bag, and capable of holding a plurality of archery accessories, in preparation for their usage.

3. The conveyance bag of claim 2, wherein there are a pair of accessory bags attaching to the side edges of the conveyance bag at one end thereof, and which accessory bags can be folded over upon the end of the cover for the archery bag, secured in position by a fastener, to add to the convenience of the assembled conveyance bag when moved upon its dolly member.

4. The conveyance bag of claim 3 wherein the top cover for the archery bag has an end, and that end of the top cover connects with the said archery bag.

5. The conveyance bag of claim 1 wherein said dolly member includes a supporting frame, upon which the conveyance bag may locate during transit or storage, a handle provided upon the upper end of said framework, to aid in the conveyance of the dolly member, said dolly member having an integral base member, connecting with the framework, and provided for supporting an end of the conveyance bag during its locating thereon said dolly member, and a pair of rollers provided proximate the juncture of the framework and the dolly base to facilitate the movement of the conveyance bag to another location during its usage.

6. The conveyance bag of claim 5 wherein said dolly member and its conveyance bag may be rested upon its end and upon the dolly base, during storage.

* * * * *